United States Patent [19]

Noguchi et al.

[11] 4,077,363

[45] Mar. 7, 1978

[54] INTERNAL COMBUSTION ENGINE

[75] Inventors: Masaaki Noguchi, Nagoya; Masaharu Sumiyoshi, Toyota; Yukiyasu Tanaka, Okazaki; Taro Tanaka, Chiryu, all of Japan

[73] Assignee: Nippon Soken, Inc., Nishio, Japan

[21] Appl. No.: 600,113

[22] Filed: Jul. 29, 1975

Related U.S. Application Data

[63] Continuation-in-part of Ser. No. 445,785, Feb. 25, 1974, Pat. No. 3,982,504.

[30] Foreign Application Priority Data

| Feb. 27, 1973 | Japan | 48-23926 |
| Nov. 6, 1973 | Japan | 48-124663 |
| Nov. 13, 1973 | Japan | 48-127952 |
| Jul. 30, 1974 | Japan | 49-87807 |

[51] Int. Cl.² .............. F02B 19/10; F02M 13/06; F02B 19/18
[52] U.S. Cl. .............. 123/32 SP; 123/75 B; 123/127; 123/32 ST
[58] Field of Search ........... 123/32 ST, 32 SP, 191 S, 123/191 SP, 75 B, 127

[56] References Cited

U.S. PATENT DOCUMENTS

| 2,242,990 | 5/1941 | Brown | 123/32 ST |
| 3,255,739 | 6/1966 | Von Seggern | 123/75 B |
| 3,318,292 | 5/1967 | Hideg | 123/32 ST |
| 3,659,564 | 5/1972 | Suzuki | 123/32 SP |
| 3,867,914 | 2/1975 | Irimajiri | 123/32 SP |
| 3,926,158 | 12/1975 | Dolza | 123/32 ST |

Primary Examiner—Ronald B. Cox
Attorney, Agent, or Firm—Cushman, Darby & Cushman

[57] ABSTRACT

A stratified internal combustion engine has a main combustion chamber for receiving a lean air-fuel mixture, a trap chamber for receiving a rich air-fuel mixture, a primary intake port for supplying the lean air-fuel mixture to the main combustion chamber, a secondary intake port for supplying the rich air-fuel mixture to the trap chamber and a partition between the primary and secondary intake ports. The primary and secondary intake ports merge at their upstream ends into a single general passage defined by an intake manifold. A single fuel injection nozzle is mounted on the intake manifold to inject fuel toward the upstream end of the partition so that the injected fuel is divided and distributed by the partition into the primary and secondary intake ports and thus into the main combustion chamber and the trap chamber, whereby a stratified combustion is achieved by a simplified engine construction.

9 Claims, 10 Drawing Figures

INTERNAL COMBUSTION ENGINE

CROSS-REFERENCE TO RELATED APPLICATION

This application is a continuation-in-part of our earlier copending application Ser. No. 445,785 filed Feb. 25, 1975, now U.S. Pat. No. 3,982,504.

BACKGROUND OF THE INVENTION b 1. Field of the Invention

The present invention relates to an internal combustion engine intended to reduce the harmful exhaust gases which have been public problems in recent years and, more particularly, to a so-called "stratified internal combustion engine" in which the combustion of an air-fuel mixture, which is lean as a whole, is achieved by holding an ignitable rich air-fuel mixture in the vicinity of a spark plug to thereby assure the purification of the exhaust gases.

2. Description of the Prior Art

As a stratified internal combustion engine intended for the purification of exhaust gases, an engine has been proposed which is of the type that has a combustion chamber formed by a main combustion chamber and a trap chamber having a spark plug disposed therein, and an intake system comprising a lean mixture supply means for supplying a relatively lean air-fuel mixture to the main combustion chamber and a rich mixture supply means for supplying a relatively rich air-fuel mixture to the trap chamber. The total of the lean and rich air-fuel mixture is lean as a whole, but the rich mixture introduced into and held in the trap chamber is ignitable by a spark plug.

In general, in this type of internal combustion engine, assuming that the air-fuel ratio of the total of the lean and rich air-fuel mixture is fixed, if the air-fuel ratio of the rich air-fuel mixture supplied by the rich mixture supply means is determined to be small, the air-fuel mixture present in the trap chamber just before the mixture is ignited by the spark plug can be rich accordingly. Thus, it is advantageous to enrich the air-fuel mixture for the trap chamber as far as the stratification of the mixtures is concerned. However, because the atomization of the fuel becomes poor as the air-fuel ratio of the air-fuel mixture is made smaller (enrichment of the mixture), it is disadvantageous to enrich the air-fuel mixture in the trap chamber as far as the atomization of the fuel is concerned. In order to realize the purification of exhaust gases by the achievement of certain stratified combustion, appropriate air-fuel ratios should be determined for the lean and rich air-fuel mixtures.

As the lean and rich mixture supply means, either an air-fuel intake system including carburetors or a fuel injection system including fuel injection nozzles has conventionally been employed. In either case, different carburetors or fuel injection nozzles have been used for lean and rich air-fuel mixtures, respectively. This is partly because a carburetor or fuel injection nozzles are naturally required for the rich air-fuel mixture and partly because the substitution of air for the lean air-fuel mixture is disadvantageous to the purification of exhaust gases for the above reason and, thus, a carburetor or fuel injection nozzles have been needed for the lean air-fuel mixture.

It will be apparent that the installation of different carburetors or fuel injection nozzles for the lean and rich air-fuel mixtures, respectively, increases the cost of manufacture and makes the engine construction complicated.

SUMMARY OF THE INVENTION

In view of the above, the present invention aims to provide an improved internal combustion engine which is simple in construction and operative to advantageously achieve stratified combustion. The internal combustion engine according to the present invention has at least one cylinder, a piston in the cylinder, a cylinder head cooperating with the cylinder and the piston to define a main combustion chamber for receiving a lean air-fuel mixture, a trap chamber for receiving a rich air-fuel mixture and disposed adjacent to the main combustion chamber, a primary intake port in the cylinder head for supplying the lean air-fuel mixture to the main combustion chamber, a secondary intake port in the cylinder head for supplying the rich air-fuel mixture to the trap chamber, separating wall means preferably in the form of a partition between the primary and secondary intake ports, the primary and secondary intake ports merging at their upstream ends into a general intake passage which may be defined by an intake manifold, and a single fuel injection nozzle so positioned as to inject fuel toward the upstream end of the partition, whereby the injected fuel is divided and distributed by the partition into the primary and secondary intake ports. The divided amounts of the fuel are guided through the primary and secondary intake ports towards the main combustion chamber and the trap chamber, respectively. The internal combustion engine of the present invention, therefore, requires only one fuel injection nozzle for each cylinder to produce the lean and rich air-fuel mixtures. With the simplified engine construction, the invention achieves stratified combustion to advantageously reduce harmful components of the exhaust gases.

DESCRIPTION OF PREFERRED EMBODIMENTS

Figure 1:
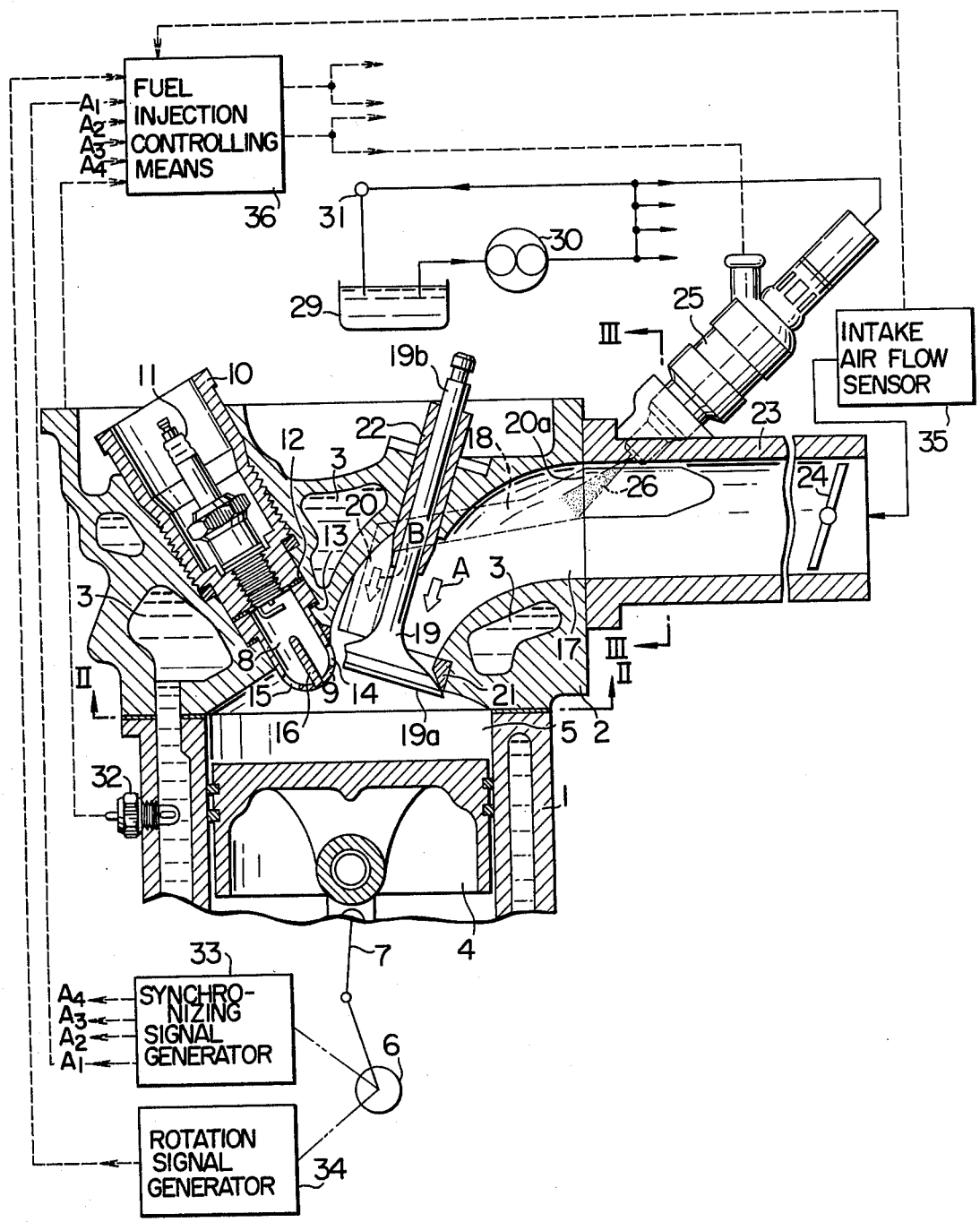
FIG. 1 is a partly sectional and partly diagrammatic view of a first embodiment of the internal combustion engine according to the present invention.
Figure 2:
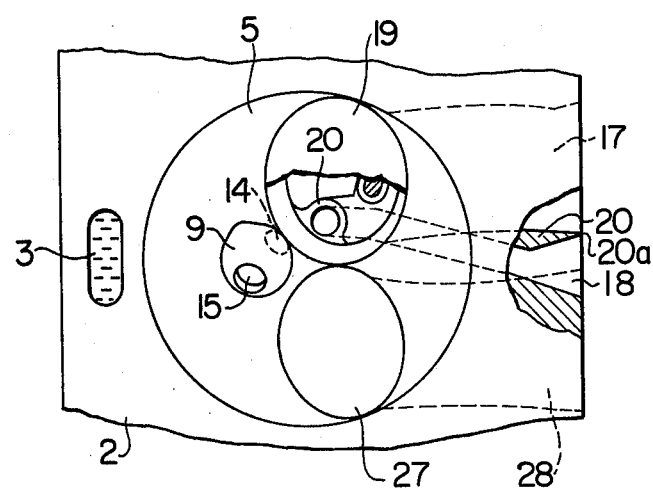
FIG. 2 is a sectional view taken along line II—II in FIG. 1.
Figure 3:
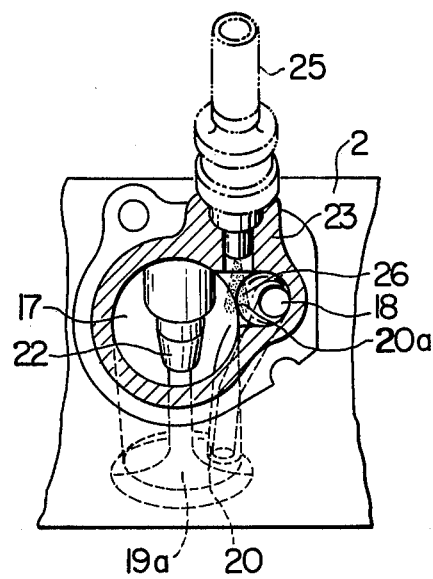
FIG. 3 is a sectional view taken along line III—III in FIG. 1.

Referring to FIGS. 1 to 3 of the drawings, the internal combustion engine of a first embodiment has four cylinders, only one of which is shown. A cylinder head 2 is firmly mounted on the top of the cylinder 1. Cooling water passages 3 are formed in the cylinder 1 and the cylinder head 2. A piston 4 is reciprocally housed in the cylinder 1 and a top face which cooperates with the inner peripheral surface of the cylinder 1 and the bottom surface of the cylinder head 2 to define a main combustion chamber 5 which is designed to receive a lean air-fuel mixture on the intake stroke. The piston 4 is operatively connected to a crank shaft 6 by means of a connecting rod 7 so that the reciprocal movement of the piston 4 is converted into a rotary motion of the crank shaft 6.

A trap chamber 8 for trapping therein a rich air-fuel mixture on the intake stroke is formed in a trap chamber housing 9 which has a generally cup-like configuration having a hemispherical end and which is mounted on the cylinder head 2 with the hemispherical end projecting into the main combustion chamber 5. The trap chamber housing 9 is secured to the cylinder head 2 by means of a spark plug mounting member 10 which is screwed into the cylinder head 2 and holds therein a spark plug 11 for producing spark discharge. The spark plug 11 has a set of electrodes disposed in the trap chamber 8. Sealing washers 12 and 13 are disposed between the trap chamber housing 9 and the spark plug mounting 10 and between the trap chamber housing 9 and the cylinder head 2, respectively.

Suction and discharge apertures 14 and 15 are formed in the part of the trap chamber housing 9 which extends into the main combustion chamber 5. The suction aperture 14 is formed in the side of the trap chamber housing 9 adjacent to an intake port, which is to be described later, and directed to the intake port, while the discharge aperture 15 is formed in the side of the trap chamber housing 9 adjacent to the piston 4 and directed to the top face thereof. The suction aperture 14 is to communicate the trap chamber 8 with the intake port, whereas the discharge aperture 15 is to communicate the trap chamber 8 with the main combustion chamber 5. The trap chamber housing 9 has a partition 16 provided on the hemispherical end thereof and extending a distance into the trap chamber 8 to divide the part of the trap chamber adjacent to the main combustion chamber 5 into two zones one of which is adjacent to suction aperture 14, the other of the zones being adjacent to the discharge aperture 15. Thus, a continuous path extending from the suction aperture 14 to the discharge aperature 15 is formed in the trap chamber 8, the electrodes of the spark plug 11 being disposed in the path.

The cylinder head 2 is formed therein with a primary intake port 17 and a secondary intake port 18. The primary intake port 17 is to feed the lean air-fuel mixture to the main combustion chamber 5 and communicated therewith by an intake valve 19. The secondary intake port 18 is to feed the rich air-fuel mixture to the trap chamber 8 and has a downstream end open to the primary intake port 17 just upstream of a valve head 19a of the intake valve 19. The open end of the secondary intake port 18 is positioned adjacent to the suction aperture 14 in the trap chamber 8 and directed generally toward the suction aperture 14 when the intake valve 19 is opened. The valve head 19a of the intake valve 19 when opened is positioned on the opposite side of the open end of the secondary intake port 18 with respect to the suction aperture 14 to assist the communication between the suction aperture 14 and the secondary intake port 18.

The primary and secondary intake ports 17 and 18 are separated by a partition 20 which in the illustrated embodiment is a part of the cylinder head 2. The partition 20 has an upstream end extending to a point 20a which is located in the same plane as that of one side face of the cylinder head 2. The valve head 19a is cooperative with a valve seat 21. A valve system 19b of the intake valve 19 slidably extends through a valve guide 22. An intake manifold 23 is connected to said one side face of the cylinder head 2 and defines therein an intake passage which is in communication with both of the primary and secondary intake ports 17 and 18 in the cylinder head 2. In other words, the upstream ends of the primary and secondary intake ports 17 and 18 merge into a single general passage defined by the intake manifold 23. The part of the intake manifold 23 adjacent to the cylinder head 2 has a cross-sectional shape which includes a first generally circular section corresponding to the primary intake port 17 and a second generally circular section corresponding to the secondary intake port 18, whereas the remaining part of the intake manifold 23 has a generally circular cross-section. A throttle valve 24 is disposed in the intake manifold 23 and operatively connected to an accelerator pedal (not shown) for the control of the amount of air to be sucked into the cylinder 1. The intake manifold 23 is connected at its upstream end to an air cleaner (not shown).

Mounted on the intake manifold 23 is a fuel injection nozzle 25 which is of an electromagnetically operated type in the illustrated embodiment and is positioned such that the fuel injected by the nozzle forms a jet (indicated by 26) which is directed from a point upstream of the upstream end 20a of the partition 20 obliquely to the upstream end 20a so that the injected fuel is divided and distributed by the partition 20 to the primary and secondary intake ports 17 and 18.

As shown in FIG. 2, the engine also has an exhaust valve 27 and an exhaust port 28.

It will be understood from the above description that primary and secondary intake ports and a fuel injection nozzle are provided for each of the four cylinders of the engine. The intake manifold 23 for the cylinder 1 is united at a point upstream of the fuel injection nozzle 25 with other intake manifolds for other cylinders (not shown).

The fuel is pumped up by a fuel pump 30 from a fuel tank 29 into a fuel circuit in which a pressure regulator 31 is provided to regulate the pressure of the fuel within the circuit so that the fuel is fed to respective fuel injection nozzles (only one of which is shown) under a regulated pressure and is injected thereby into respective intake manifolds 23. A water temperature sensor 32, such as thermister, which generates a voltage (water temperature signal) representing the temperature of the cooling water in the engine is mounted on the cylinder 1 and projects into one water passage 3. A synchronizing signal generator 33 is provided to generate a synchronizing signal each time the crank shaft 6 is rotated a ½ revolution (¼ revolution of a distributor of an ignition system). A rotary signal generator 34 is provided to generate signals representing the rotations of the engine. Disposed within the intake manifold 23 upstream of the throttle valve 24 is an intake air flow sensor 35 which generates a voltage (intake air flow signal) proportional to the air flow through the intake manifold 23 and which comprises a conventional shut-off plate. A fuel injection controlling circuit 36 is provided to operate on the basis of the all of the signals mentioned above for thereby actuating the fuel injection nozzles 25 two times per each cycle of the engine operation, i.e., on the intake and combustion strokes of the engine. In general, the combustion strokes of a four cylinder internal combustion engine take place in the first, third, fourth and second cylinders in that order. In order to operate the fuel injection nozzle for each cylinder on the intake and combustion strokes, the pair of nozzles for the first and fourth cylinders may be actuated simultaneously while the pair of nozzles for the second and third cylinders may be operated simultaneously.

Figure 4A:
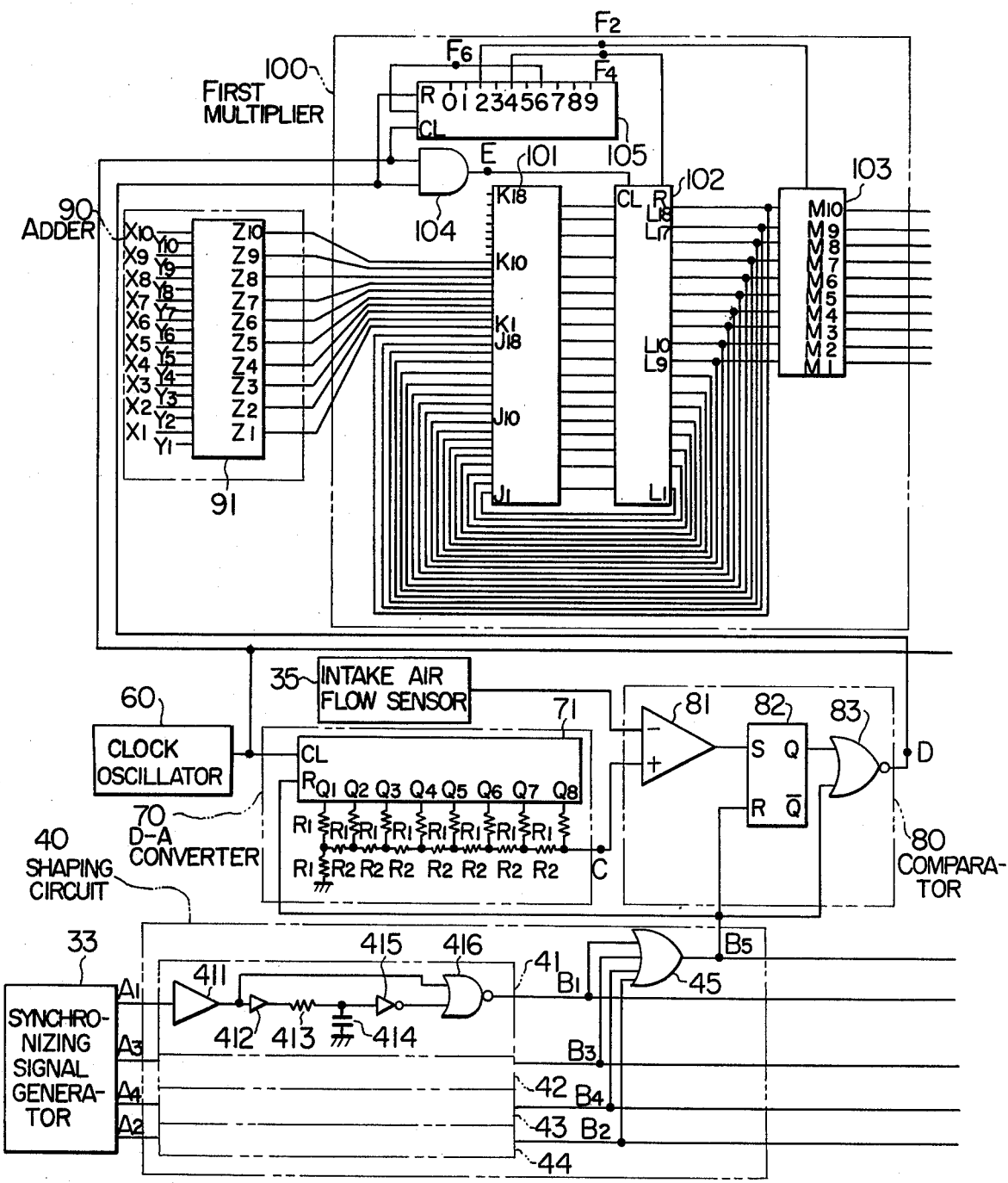
FIG. 4A is a block diagram of a part of the circuits of a fuel injection controlling means shown in FIG. 1.
Figure 4B:
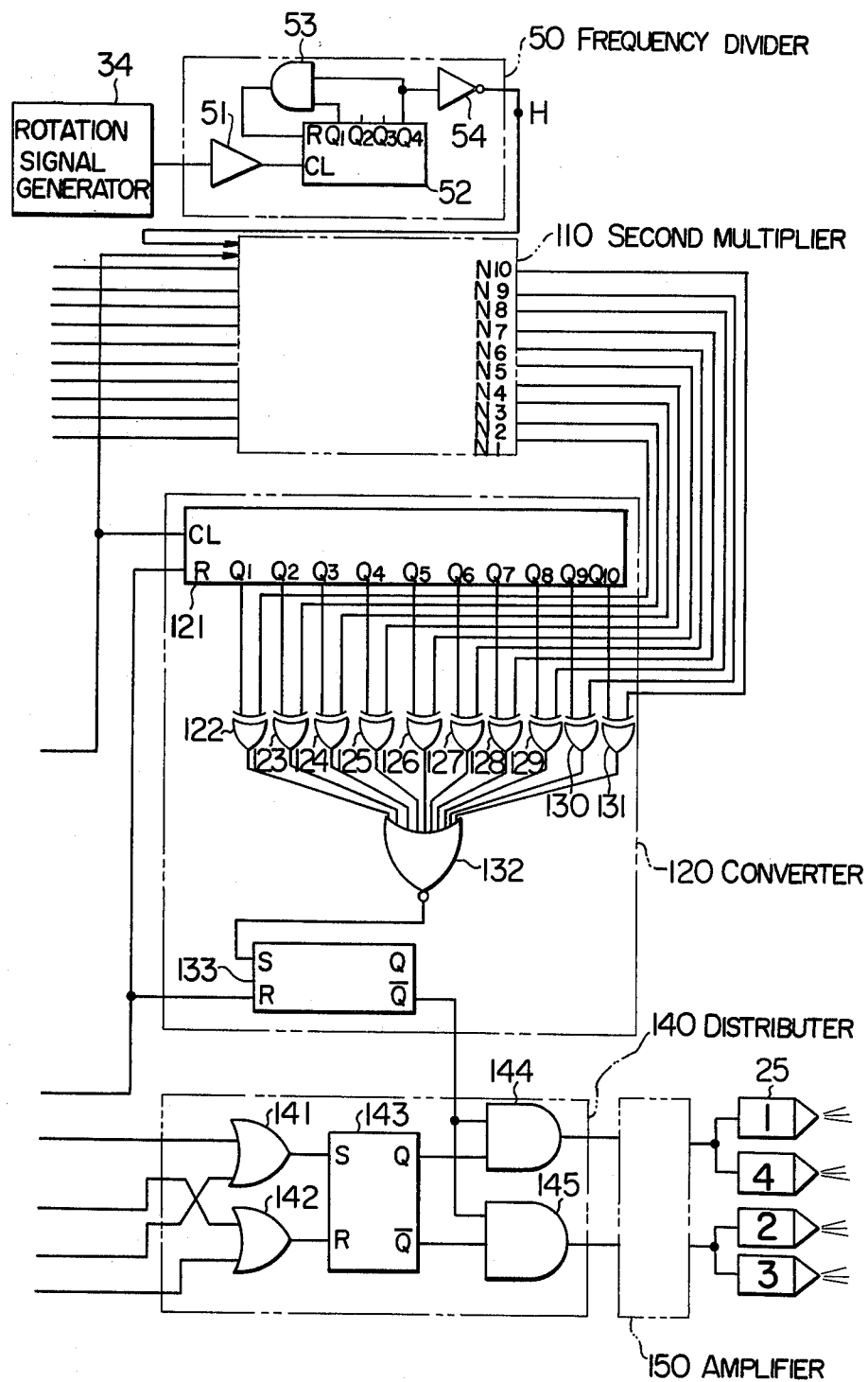
FIG. 4B is a block diagram of the remainder of the circuits of the fuel injection controlling means.
Figure 5:
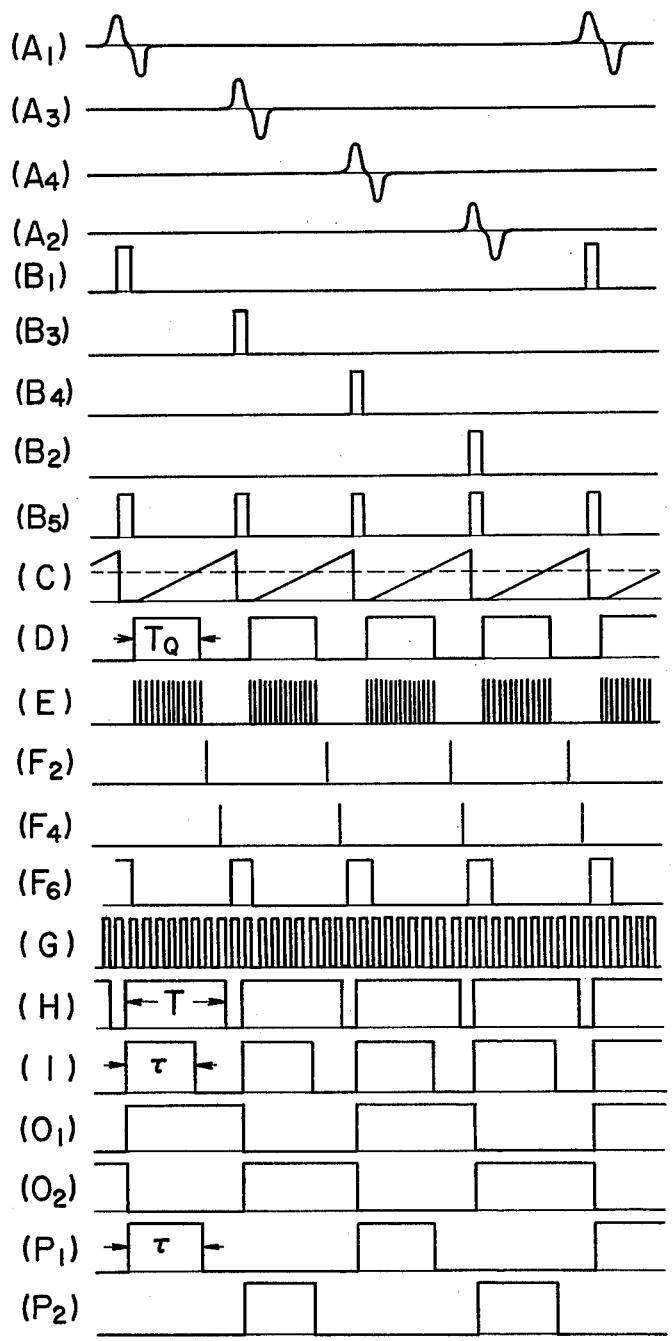
FIG. 5 diagrammatically illustrates the operations of respective circuits shown in FIGS. 4A and 4B.

The fuel injection controlling means 36 comprises electric circuits which are diagrammatically shown in FIGS. 4A and 4B and which will be discussed hereunder. The synchronizing signal generator 33, the rotation signal generator 34 and the intake air flow sensor 35 have been referred to previously. A shaping circuit 40 amplifies and shapes the synchronizing signals $A_1$, $A_2$, $A_3$ and $A_4$ from the synchronizing signal generator 33 to produce synchronizing signals $B_1$, $B_2$, $B_3$ and $B_4$ and a logical sum signal $B_5$. The pulse width of the signals $B_1$ to $B_4$ shown in FIG. 5 is 20 μs. A frequency dividing circuit 50 divides the rotation signals from the rotation signal generator 34 to produce pulse signals at time intervals inversely proportional to the rotational speed N of the engine. An oscillating circuit 60 produces clock pulses predetermined in accordance with a constant K corresponding to the air-fuel ratio (A/F) of the air-fuel mixture supplied into the engine. A D-A conversion circuit 70 operates to produce a voltage proportional to the number of the clock pulses and synchronized with the logical sum signal $B_5$. A comparing circuit 80 compares the voltage proportional to the intake air flow Q with the voltage produced by the D-A conversion circuit 70 to determine a value KQ for producing a pulse signal of a time width proportional to the intake air flow. An addition circuit 90 adds a corrected value $k'$ corresponding to the voltage generated by the water temperature sensor 32 to a constant 1.00 to produce a sum (1.00 + K'). A fist multiplication circuit 100 operates multiplication on the basis of the sum output from the addition circuit 90, the pulse signal produced by the comparing circuit 80 and the clock pulses to produce a product KQ (1 + K'). A second multiplication circuit 110 multiplies the product KQ (1 + K') produced in the first multiplication circuit 100 by the inverse number 1/N of the rotational speed of the engine to produce a product KQ (1 + K')/N. A conversion circuit 120 produces a pulse signal of a time width proportional to the product of the second multiplication circuit 110. A distribution circuit 140 distributes the pulse signals produced by the conversion circuit 120. An amplification circuit 150 amplifies electric voltage signals from the distribution circuit 140.

The structures and arrangements of the respective circuits and their functions will be described in detail hereunder with reference to FIGS. 4A, 4B and 5. The structure of the synchronizing signal generator 33 is not specifically shown but includes a single permanent magnet fixed to a rotary disc of the distributor (not shown) which is rotated one revolution per two revolutions of the crank shaft 6. Four cores having windings thereon are disposed around the rotary disc at circumferentially equal intervals so that synchronizing signals $(A_1)$, $(A_2)$, $(A_3)$ and $(A_4)$ shown in FIG. 5 are generated each time the crank shaft is rotated a ½ revolution. These signals $(A_1)$, $(A_2)$, $(A_3)$ and $(A_4)$ are synchronized with the initiation of the intake strokes of the first to fourth cylinders of the engine, respectively. The shaping circuit 40 comprises delay logical circuits 41, 42, 43 and 44 and an OR gate 45. The delay logical circuit 41 comprises a direct-current amplifier 411 which may be an IC, MC 3302P manufactured by Motorola Corporation, U.S.A., a buffer circuit 412, a resistor 413, a capacitor 414, an inverter 415 and a NOR gate 416. The delay logical circuits 42, 43 and 44 have similar structure and will not be described in more detail. Thus, the synchronizing signals $A_1$, $A_2$, $A_3$, and $A_4$ are amplified and shaped by the shaping circuit 40 which produces the synchronizing signals $(B_1)$, $(B_2)$, $(B_3)$ and $(B_4)$ and the logical sum signal $(B_5)$ shown in FIG. 5, as discussed above.

While the structure of the oscillating circuit 60 is not specifically shown, the circuit may comprise a conventional crystal oscillator and is operative to produce clock pulses of a frequency in accordance with the constant K corresponding to the air-fuel ratio (A/F) of the air-fuel mixture. The D-A conversion circuit 70 comprises an eight-bit binary counter 71 and a ladder-type resistor network including resistors of resistance R1 and resistance R2 and is operative to count the clock pulses from the oscillating circuit 60 each time the binary counter 71 is reset by a logical sum signal $B_5$ from the shaping circuit 40, so that a saw-tooth wave voltage as shown in FIG. 5 (C) is produced at the output terminal of the D-A conversion circuit 70, i.e., at a point C in FIG. 4A. Of cource, the gradient of the saw-tooth wave voltage corresponds to the constant K which represents the air-fuel ratio (A/F).

The comparing circuit 80 comprises a comparator 81, an R - S flip-flop 82 and a NOR gate 83. The comparator 81 compares the saw-tooth wave voltage shown in FIG. 5 (C) with a voltage (shown by a broken line in FIG. 5 (C)) generated by the intake air flow sensor 35 to produce "1" for thereby setting the R - S flip-flop 82 when the saw-tooth wave voltage exceeds the voltage proportional to the intake air flow. The NOR gate 83 is operative in response to a Q output signal from the R - S flip-flop 82 and the logical sum signal $B_5$ to produce a pulse signal (shown in FIG. 5 (D)) at the output terminal of the gate 83, i.e., at a point D in FIG. 4A. The time width TQ of the pulse signal is proportional to the intake air flow Q. Thus, the comparing circuit 80 operates to multiply the constant K by the intake air flow Q.

The addition circuit 90 comprises a parallel adder 91 (IC, CD4008 produced by RCA Corporation, U.S.A.). The inputs $X_{10} \ldots X_1$ of the adder 91 are binary cords corresponding to the constant 1.00. The inputs $Y_{10} \ldots Y_1$ of the adder are binary cords corresponding to the temperature of the water, while the outputs $Z_{10} \ldots Z_1$ of the adder are binary cords representing the sum outputs $(X_{10} \ldots X_1 + Y_{10} \ldots Y_1)$. As an example, in order that a corrected value KT of the water temperature may be equal to 0.2 for the constant 1.00, the inputs $X_{10} \ldots X_1$ will be 000110100 and the inputs $Y_{10} \ldots Y_1$ will be 0000010100. In order to vary the binary cords representing the corrected value KT of water temperature according to the temperature of water, an IC (CD4046 manufactured by RCA Corporation) which is operative to convert a voltage into a frequency may be used.

The first multiplier circuit 100 comprises a parallel adder 101 (IC, CD 4008 manufactured by RCA Corporation), a first memory 102 (IC, CD 4035 manufactured by RCA Corporation), a second memory 103 (IC, CD 4042 manufactured by RCA Corporation), an AND gate 104 and a counter 105 with a decimal divider (IC, CD 4017 manufactured by RCA Corporation). The arrangement is such that the output $L_{18} \ldots L_1$ of the memory circuit 102 are fed to the adder 102 as its inputs $J_{18} \ldots J_1$. The counter 105 is so arranged that, when six clock pulses have been fed to the counter, it is inhibited from performing any further counting operation. When the pulse signal from the comparing circuit 80 and having the time width TQ (shown in FIG. 5(D) is "1", clock pulses from the oscillating circuit 60 will be produced at the output terminal of the AND gate 104, i.e., at a point E in FIG. 4A. The number of the clock pulses is $n$ proportional to the time width TQ, as shown in FIG. 5(E). When the output of the comparing circuit 80 has become "0", the clock pulses will be counted by the counter 105 with the decimal divider. When the counter 105 counts the second, fourth and sixth clock pulses, the counter will produce at its output terminals, i.e., at points $F_2$, $F_4$ and $F_6$, outputs "1" as shown in FIG. 5 ($F_2$), ($F_4$) and ($F_6$). When the counter 105 counts the fourth clock pulse, the memory 102 is reset and the outputs $L_{18} \ldots L_1$ all become "0". Thereafter, as the memory 102 receives the clock pulses as shown in FIG. 5(E), the outputs $L_{18} \ldots L_1$ will become $1 \times (Z_{10} \ldots Z_1)$, $2 \times (Z_{10} \ldots Z_1) \ldots n \times (Z_{10} \ldots Z_1)$. The memory 102 is actuated by the clock signal shown in FIG. 5 ($F_2$) to store the most significant ten digits of the outputs $n \times (Z_{10} \ldots Z_1)$ as $M_{10} \ldots M_1$. It will be remembered that the number $n$ of the clock pulses is a valve proportional to the intake air flow Q, while $M_{10} \ldots M_1$ are binary cords according to (1.00 + K'). Thus, the first multiplier circuit 100 has operated KQ $\times$ (1.00 + K').

The structure and arrangement of the rotation signal generator 34 are not specifically shown, but this generator is of the type that produces 136 pulse signals for two revolutions of the crank shaft and may be constructed of a ring gear and an electromagnetic pickup. Thus, the period of one signal is inversely proportional to the rotational speed of the engine.

The frequency division circuit 50 comprises a direct-current amplifier 51 (IC, MC3302P manufactured by Motorola Corporation), a binary counter 52, and AND gate 53 and an inverter 54. The direct-current amplifier 51 amplifies and shapes the rotation signals from the rotation signal generator 34 into pulse signals shown in FIG. 5(G). The pulse frequency of the signals is divided by the binary counter 52 first into ½, then into ¼, then into ⅛ and finally into 1/16 of the initial frequency. Simultaneously with the initiation of the ⅛ division operation, the AND gate 53 produces an output "1" to reset the binary counter 52, so that a pulse signal having time width T as shown in FIG. 5(H) is produced at the output terminal of the inverter 54, i.e., at a point H in FIG. 4B. The time width T corresponds to eight pulses shown in FIG. 5(G) and is proportional to the inverse number 1/N of the rotational speed H of the engine.

The second amplifier circuit 110 has structure and arrangement (not shown) similar to those of the first multiplier circuit 100 except that the second multiplier circuit 110 is connected to the frequency division circuit 50, the oscillating circuit 60 and the first multiplier circuit 100, whereas the first multiplier circuit 100 is connected to the oscillating circuit 60, the comparing circuit 80 and the addition circuit 90. The second multiplier circuit 110 operates $n'$ times ($n'$ is the number of the clock pulses provided by the oscillating circuit 60 within the time width T of the pulse signal shown in FIG. 5(H) to add the outputs $M_{10} \ldots M_1$ of the first multiplier circuit 100 for thereby producing outputs $N_{10} \ldots N_1$ which represent $n' \times M_{10} \ldots M_1$. Namely, the second multiplier circuit 110 operates KQ $\times$ (1 + K')/N.

The conversion circuit 120 comprises a 10-bit binary counter 121, Exclusive OR gates 122, 123, 124, 125, 126, 127, 128, 129, 130 and 131, a 10-input NOR gate 132 and an R - S flip-flop 133. When a logical sum signal $B_5$ from the shaping circuit 40 has reset the binary counter 121 and the R - S flip-flop 133, the binary counter 121 counts the clock pulses from the oscillating circuit 60 and emits the counted value as outputs $Q_{10} \ldots Q_1$. When the outputs $Q_{10} \ldots Q_1$ of the binary counter 121 become coincident with the outputs $N_{10} \ldots N_1$ of the second multiplier circuit 110, all the Exclusive OR gates 122 to 131 produce "0", with the result that the NOR gate 132 resets the R - S flip-flop 133. Thus, the R - S flip-flop 133 produces "1" as shown in FIG. 5(I) at its $\overline{Q}$ output terminal during a period of time from the time the flip-flop 133 is reset by the time it is set, the period of time being proportional to the outputs $N_{10} \ldots N_1$ of the second multiplier circuit 110. The time while the $\overline{Q}$ output is "1" represents KQ $\times$ (1 30 K')/N.

The distribution circuit 140 comprises an OR gates 141 and 142, and R - S flip-flop 143 and AND gates 144 and 145. The R - S flip-flop 143 is set by synchronizing signals $B_1$ and $B_4$ from the shaping circuit 40 and reset by synchronizing signals $B_2$ and $B_3$ from the shaping circuit and produces at Q and $\overline{Q}$ terminals output signals shown in FIG. 5 ($O_1$) and ($O_2$). Thus, in the AND gates 144 and 145 are produced pulse signals having a time width proportional to the intake air flow Q and inversely proportional to the rotational speed N of the engine, as shown in FIG. 5 ($P_1$) and ($P_2$). The pulse signal shown in FIG. 5 ($P_1$) actuates the fuel injection nozzles for the first and fourth cylinders through the amplifier circuit 150 the structure and arrangement of which are not specifically shown. Similarly, the pulse signal shown in FIG. 5 ($P_2$) actuates the fuel injection nozzle for the second and third cylinders. The combustions take place in the first, third, fourth and second cylinders in that order, as discussed above. Thus, if the fuel injection nozzle for the first cylinder injects the fuel on the intake stroke of the first cylinder, the fuel injection nozzle for the fourth cylinder injects the fuel on the combustion stroke of the fourth cylinder. The fuel injection nozzles for the second and third cylinders operate in a manner similar to that of the first and fourth cylinder nozzles. As discussed, the fuel injection nozzles for respective cylinders inject fuel two times per one cycle of the engine operation on the intake and combustion strokes of respective cylinders. It is a matter of course that the total amount of the fuel thus injected per cycle of operation should be equal to the amount of fuel required by the engine for one cycle of operation and is decided by the frequency of the clock pulses produced by the oscillating circuit 60.

The structure and arrangement of the fuel injection controlling means 36 described above are merely an example. In the fuel injection controlling means 36, the pulse signals of the time width inversely proportional to the rotational speed of the engine are obtained by the rotation signal generator 34 and the frequency division circuit 50. Alternatively, the pulse signals of time width inversely proportional to the engine speed may be obtained by using the synchronizing signals $B_1$, $B_2$, $B_3$ and $B_4$ produced by the shaping circuit 40. In addition, an analog operation may alternatively be employed to decide the time width $\tau$ of the pulse signals which decides the time while the fuel injection nozzles are opened. Further alternatively, a mechanical control system may be employed in place of the discribed electrical one. In this alternative case, it will be convenient to use a plunger pump operable by a cam.

With the above-described arrangement of the engine, the intake air is controlled by the throttle valve 24 and, after passing through the intake manifold 23, the air is divided by the partition 20 into two independent flows through the primary and secondary intake ports 17 and 18, as shown by arrows A and B, and is fed into the main combustion chamber 5 and the trap chamber 8 when the intake valve 19 is opened. Because the fuel is injected by the fuel injection nozzle 25 toward the upstream end 20a of the partition 20 which separates the primary and secondary intake ports 17 and 18, the injected fuel is divided by the partition 20 into two streams which are introduced into the primary and secondary intake ports 17 and 18, respectively. The fuel introduced into the primary intake port 17 is mixed with the air of the air flow A to produce a lean air-fuel mixture, whereas the fuel introduced into the secondary intake port 18 is mixed with the air of the air flow B to produce a rich air-fuel mixture. By the operation of the fuel injection controlling means 36, the fuel injection nozzle 25 is actuated to inject the fuel two times per each cycle of operation, i.e., on the intake and combustion strokes. Because the intake valve 19 is open on intake stroke, the lean air-fuel mixture produced by the fuel injection on the intake stroke is immediately sucked into the main combustion chamber 5, while a substantial part of the rich air-fuel mixture produced on the same stroke is sucked into and trapped in the trap chamber 8. The lean and rich air-fuel mixtures produced by the fuel injection on the combustion stroke are retained in the primary and secondary intake ports 17 and 18, respectively, by the time the engine operation proceeds to a suceeding intake stroke. Thereafter, the air-fuel mixtures are respectively sucked into the main combustion chamber 5 and the trap chamber 8 together with lean and rich air-fuel mixtures subsequently produced on the succeeding intake stroke. The feature that the air-fuel mixtures produced on a combustion stroke stay in the intake ports for a predetermined time advantageously facilitates the atomization of the fuel. The air-fuel mixtures sucked into and held in the main combustion chamber 5 and the trap chamber 8 are more appropriately atomized at the time of ignition (to be described later) compared with the case where the main combustion and trap chambers 5 and 8 receive air-fuel mixtures produced by the fuel injected on intake stroke only. The introduction of the rich air-fuel mixture into the trap chamber 8 from the secondary intake port 18 is achieved through the suction aperture 14 in the trap chamber because the open end of the secondary intake port 18 is communicated through a part of the main combustion chamber 5 with the suction aperture 14 when the intake valve 19 is opened. At this time, the residual gases are discharged from the trap chamber 8 through the discharge aperture 15. The partition 16 in the trap chamber is operative to effectively prevent the occurrence of a disadvantageous situation that a fresh rich air-fuel mixture from the suction aperture 14 flows directly to and through the discharge aperture 15 and out of the trap chamber with residual gases remaining therein. Thus, the partition 16 greatly improves the efficiency of suction and trapping of the rich air-fuel mixture in the trap chamber 8.

The lean and rich air-fuel mixtures which have thus been produced by the injection of fuel by a single fuel injection nozzle 25 for each cylinder and received and held in the main combustion and trap chambers 5 and 8 will then be compressed and ignited by the spark plug 11. The ignition by the spark plug 11 is carried out directly with the rich mixture held in the trap chamber 8 (in which the mixture is set at an air-fuel ratio appropriate for spark ignition). Combustion takes place in the trap chamber and torch jets spurt through the suction and discharge apertures 14 and 15 into the main combustion chamber 5 to burn the lean air-fuel mixture therein. It has been well known that, by the combustion of air-fuel mixtures which are lean as a whole, the harmful components of engine exhaust gases are greatly reduced.

Now, a description will be made with respect to the ratio between the amounts of fuel injected by each fuel injection nozzle 25 and divided and distributed into the primary and secondary intake ports 17 and 18. If the ratio of the fuel introduced into the secondary intake port 18 with respect to the total of the fuel injected by a nozzle 25 is large, the air-fuel mixture produced in the secondary intake port 18 is extremely rich, with the result that a large amount of fuel is trapped in the trap chamber 8 and, thus, the air-fuel ratio $ac$ in the trap chamber 8 just prior to the ignition is small. On the other hand, the air within the secondary intake passage 18 is not enough to appropriately atomize the fuel therein. To the contrary, if the ratio of fuel injected into the primary intake port 17 is increased to a value at which a substantially uniform air-fuel mixture is produced, i.e., the air-fuel mixture produced in the primary intake port 17 is of an air-fuel ratio substantially equal to that of the air-fuel mixture produce in the secondary intake port 18, an appropriate atomization is obtainable. In this case, however, the air-fuel ratio $ac$ in the trap chamber 8 is insufficient for appropriate spark ignition. As such, there are two opposed characteristics. Thus, an appropriate ratio of division of fuel charge will be such that air-fuel ratio $ac$ is as large as possible within the range wherein a stable spark ignition of the air-fuel mixture in the trap chamber can be obtained. In other words, the ratio of the fuel introduced into the secondary intake port 18 with respect to the total of the fuel injected by a nozzle 25 should preferably be decided to be as small as possible based upon the consideration of the air-fuel ratio $ac$. The appropriate air-fuel ratio $ac$ will vary with the operating conditions of the engine but, in general, will approximately be as follows:

| | |
|---|---|
| Within part-load operation area | $ac = 9$ to $13$ |
| Within heavy-load operation area | $ac = 9$ to $16$ | (1)

Thus, the ratio of division may be so decided that a mean air-fuel ratio $ac$ is as follows:

$$ac = 12 \text{ to } 14 \qquad (2)$$

Assuming that the ratio of the amount of the fuel introduced into the secondary intake port 18 with respect to the total amount of the fuel injected by a fuel injection nozzle 25 is represented by $\lambda f$; the ratio of the air flow through the secondary intake port 18 with respect to the total air flow through both of the primary and secondary intake ports 17 and 18 is $\lambda a$; the air-fuel ratio in the primary intake port 17 is αL; the air-fuel ratio in the secondary intake port 18 is αR; the mean air-fuel ratio of both air-fuel mixtures is αT; and the ratio of the amount of a fresh air-fuel mixture supplied to the trap chamber 8 from the secondary intake port 18 with respect to the total amount of the fresh air-fuel mixture present in the trap chamber just prior to ignition is ηt, the relationship between these factors will be defined by the following equations:

$$\frac{1}{\alpha T} = \frac{\lambda a}{\alpha R} + \frac{(1 - \lambda a)}{\alpha L} \quad (3)$$

$$\alpha R = \frac{\lambda a}{\lambda f} \cdot \alpha T \quad (4)$$

Since the parts (represented by ηt) of the total fresh air-fuel mixture in the trap chamber 8 just prior to the ignition are received from the secondary intake port 18 while the remainder (1 − ηt) of the total fresh air-fuel mixture in the trap chamber is received from the parimary intake port 17, the air-fuel ratio αc in the trap chamber at that time will be given by:

$$\frac{1}{\alpha c} = \frac{\eta t}{\alpha R} + (1 - \eta t) \cdot \frac{1}{\alpha L} \quad (5)$$

Eliminating αR and αL between equations (3), (4) and (5) gives;

$$\frac{1}{\alpha c} = \eta t \cdot \frac{\lambda f}{\lambda a} \cdot \frac{1}{\alpha T} + (1 - \eta t) \cdot \frac{(1 - \lambda f)}{(1 - \lambda a)} \cdot \frac{1}{\alpha T} \quad (6)$$

wherein λa is a constant dependent upon the manner of the installation of the partition 20 and given by tests as follows:

$$\lambda a = 0.02 \text{ to } 0.10 \quad (7)$$

ηt is a constant dependent upon the configurations of the trap chamber 8, the intake valve 19, the partition 20 and the main combustion chamber 5 and given by tests as follows:

$$\eta t = 0.1 \text{ to } 0.3 \quad (8)$$

Assuming that the mean values of λa and ηt are 0.06 and 0.15, respectively, equation (6) can be rewirtten as:

$$\frac{1}{\alpha c} = \frac{1}{\alpha T}(1.6 \lambda f + 0.9) \quad (9)$$

Figure 6:
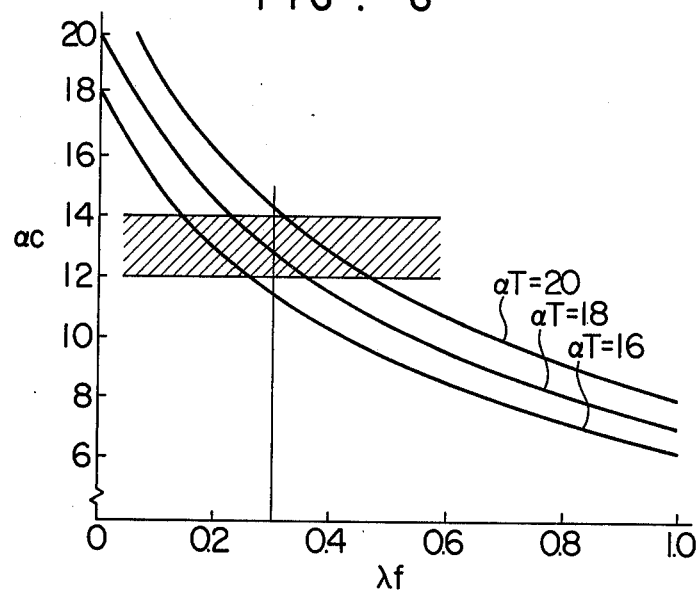
FIG. 6 graphically illustrates the operation of the internal combustion engine according to the present invention.

FIG. 6 graphically illustrates the relationship between αc and λf with respect to αT which is equal to 16, 18 and 20. Since equation (2) shows that the appropriate range of αc is from 12 to 14, FIG. 6 shows that λf may be decided to be substantially equal to 0.3 in order to obtain such a range of αc when αT is determined to be from 16 to 20.

As described, because the ratio of division λf is greatly influenced by λa and ηt, effective stratified combustion in internal combustion engines will be obtainable by first searching for αi a and ηt, then deciding the range of αT and thereafter determining λf for respective engines.

Figure 7:
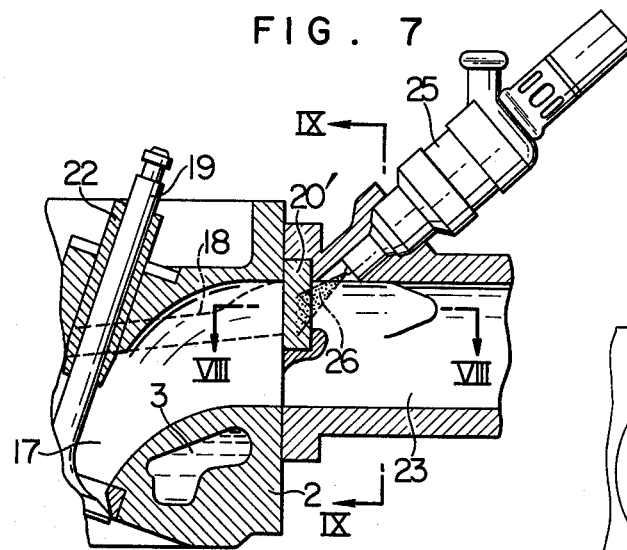
FIG. 7 is a partly sectional fragmentary view of a second embodiment of the internal combustion engine according to the present invention.
Figure 9:
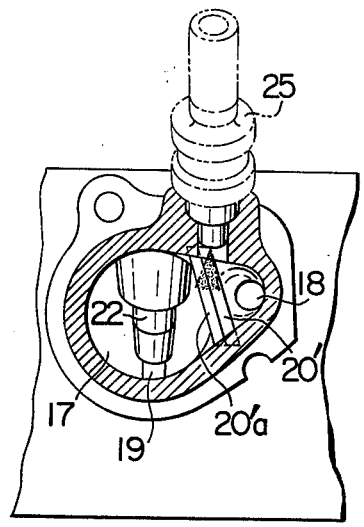
FIG. 9 is a sectional view taken along line IX—IX in FIG. 7.
Figure 8:
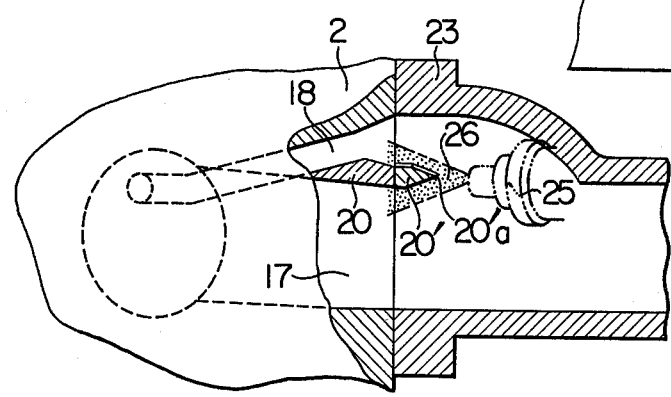
FIG. 8 is a sectional view taken along line VIII—VIII in FIG. 7.

FIGS. 7 and 8 illustrates important parts of the internal combustion engine according to a second embodiment of the invention, in which parts similar to those of the first embodiment are designated by similar reference numerals. The second embodiment comprises a wedge-shaped dividing plate 20' provided at the upstream end of a partition 20 which is a part of a cylinder head 2 and separates a primary intake port 17 from a secondary intake port 18 in the cylinder head 2. The dividing plate 20' is prepared separately from the partition 20 and disposed within an intake manifold 23 in contiguous relationship with the upstream end of the partition 20. A fuel injection nozzle 25 is mounted on the intake manifold 23 and positioned such that the fuel injected by the nozzle is directed toward a pointed upstream end 20'a of the dividing plate 20'. This embodiment will be advantageous in that the manufacture of the engine does not need any special work, such as one to sharpen the upstream end of the partition 20 in the cylinder head 2, and that the dividing plate 20' assures accurate division and distribution of the fuel from the fuel injection nozzle into the primary and secondary intake ports 17 and 18.

In the embodiments described, each injection nozzle 25 is actuated to inject the fuel two times per each cycle of engine operation to facilitate better atomization of the fuel. The principle of the present invention is not limited to the described embodiments. In fact, the fuel injection nozzle 25 may be operated to inject fuel either one time or more than two times per each cycle of engine operation. Even with the case where fuel in injected one time per one cycle, the injection timing is not limited to the intake stroke and may be in anyone of the other strokes. Further alternatively, a continuous injection system may be employed with sufficiently effective results.

With the described embodiments, moreover, the downstream end of the secondary intake port 18 is open to the primary intake port 17 at a position just upstream of the intake valve 19. In a modified arrangement of the engine, the secondary intake port 18 may be directly communicated with the trap chamber 8 through a valve provided for solely use with the secondary in-take port. Moreover, the intake manifold 23 may be connected at its upstream end with a carburetor (not shown) which produces a lean air-fuel mixture to be supplied through the intake manifold into the primary and secondary intake ports 17 and 18. In this case, the amount of fuel injected by the nozzle 25 will be reduced correspondingly.

Moreover, the single general passage into which the primary and secondary intake ports 17 and 18 merge may be formed in the cylinder head 2. In this case, the fuel injection nozzle 25 may be mounted on the cylinder head 2 and project into the general passage formed therein.

What is claimed is:

1. In a internal combustion engine including at least one cylinder, a piston in said cylinder, a cylinder head cooperating with said piston and cylinder to define a combustion chamber, means defining therein a trap chamber adjacent to said combustion chamber, a primary intake port for introducing a lean air-fuel mixture into said combustion chamber, a secondary intake port for supplying a rich air-fuel mixture to said trap chamber, means for producing said air-fuel mixtures, an intake valve having a valve stem and a valve head disposed downstream of said primary intake port, said trap chamber defining means further defining therein at least one suction passage means and at least one discharge passage means, said suction passage means being so operatively associated with said secondary intake port that said rich air-fuel mixture is received from said secondary intake port through said suction passage means into said trap chamber on an intake stroke of said engine, said combustion chamber being in communication with said trap chamber at least through said discharge passage means, a spark plug having a set of electrodes disposed in said trap chamber, said trap chamber defining means, said set of electrodes and said suction and discharge passage means being arranged such that a substantial part of said rich mixture introduced into said trap chamber is retained therein around said set of electrodes during the compression process of said engine, said spark plug being operative to ignite the rich mixture in said trap chamber to produce a torch jet which spurts at least through said discharge passage means into said combustion chamber to burn the lean mixture therein, said trap chamber defining means further having thereon a partition disposed between said suction and discharge passage means and extending into said trap chamber to partially divide the same so that a continuous path is formed in said trap chamber, said path interconnecting said suction and discharge passages, said set of electrodes being disposed in said path, whereby a fresh rich air-fuel mixture sucked into said trap chamber on the intake stroke of said engine forces out residual gases produced during the combustion process of said engine to effectively scavenge said trap chamber, wherein the improvement comprises wall means separating said primary and secondary intake ports which merge at their upstream ends into a single general passage and wherein said air-fuel mixture producing means comprises a single fuel injection nozzle provided in said general passage and so positioned as to inject the fuel toward the upstream end of said wall means whereby the injected fuel is divided and distributed by said separating wall means into said primary and secondary intake ports.

2. An internal combustion engine according to claim 1, wherein said upstream end of said wall means is wedge-shaped and sharpened.

3. An internal combustion engine according to claim 1, wherein said trap chamber defining means comprises a hollow tubular member mounted on said cylinder head and having a substantially closed end portion protruding into said combustion chamber, said suction and discharge passage means being formed by suction and discharge apertures formed in said substantially closed end portion of said tubular member, and wherein said secondary intake port, said intake valve, said combustion chamber and said suction aperture are so positioned with respect to each other that said rich air-fuel mixture is introduced into said trap chamber through said suction aperture when said intake vale is open.

4. An internal combustion engine according to claim 3, wherein said secondary intake port has its downstream end open to said primary intake port just upstream of said valve head when in its closed position and said suction aperture is located adjacent to and directed generally toward the open end of said secondary intake port when said intake valve is open.

5. An internal combustion engine according to claim 1 further including electric means for controlling the operation of said fuel injection nozzle.

6. In an internal combustion engine having
a cylinder,
a piston in said cylinder,
a cylinder head cooperating with said piston and cylinder to define a main combustion chamber,
an intake port formed in said cylinder head and communicating with said main combustion chamber,
an intake passage connected to said intake port for supplying air thereto,
an intake valve having a valve stem and a valve head connected thereto,
said intake valve being movably positioned with respect to said intake port,
a throttle valve pivotally disposed in said intake passage for controlling the amount of air passage therethrough,
a trap chamber formed adjacent to said main combustion chamber,
said trap chamber being always in communication with said main combustion chamber,
means for supplying lean and rich air-fuel mixtures into said main combustion chamber and said trap chamber, respectively,
a spark plug having a set of electrodes disposed in said trap chamber,
said spark plug being operative to ignite said rich air-fuel mixture in said trap chamber to provide a torch jet which ignites said lean air-fuel mixture in said main combustion chamber, the improvement comprising,
said air-fuel mixture supplying means comprising a fuel injection nozzle open to said intake passage downsteam of said throttle valve for injecting fuel to form said lean and rich air-fuel mixtures, and
a separating wall formed integral with said cylinder head upstream of said intake valve in said intake port to divide said intake port into first and second ports, said second port having a downstream end in said intake port disposed adjacent to said trap chamber said fuel being injected toward the upstream end of said separating wall so that said injected fuel is divided by said separating wall into at least two portions which respectively produce said lean and rich air-fuel mixtures in said first and second ports.

7. An internal combustion engine according to claim 6, wherein said trap chamber has at least one suction passage means for introducing said rich airfuel mixture into said trap chamber and at least one discharge passage means for discharging residual gases in said trap chamber therethrough.

8. An internal combustion engine comprising:
a cylinder;
a piston in said cylinder;
a cylinder head cooperating with said cylinder and piston to define a main combustion chamber;
a trap chamber disposed in said cylinder head and having at least one suction aperture and at least one discharge aperture;
a spark plug having a set of electrodes exposed to the interior of said trap chamber;
first and second intake ports formed integral with said cylinder head upstream of said intake valve and communicating with said main combustion chamber, said second intake port having a downstream end in said intake port disposed adjacent to said trap chamber;
an intake valve having a valve stem and a valve head connected thereto, said intake valve being movably positioned with respect to said intake ports;

an intake passage connected to said first and second intake ports for supplying air thereto;

a throttle valve pivotally mounted in said intake passage for controlling the amount of the air passing therethrough;

a fuel injection nozzle open to said intake passage downstream of said throttle valve for injecting fuel thereinto, a portion of the injected fuel being introduced into said second intake port to form therein a rich air-fuel mixture, the remainder of said injected fuel being introduced into said first intake port to form therein a lean air-fuel mixture;

a portion of said rich air-fuel mixture being introduced into said trap chamber through said suction aperture and the remainder of said rich air-fuel mixture and said lean air-fuel mixture being introduced into said main combustion chamber when said intake valve is opened, residual gases remaining in said trap chamber being discharged into said main combustion chamber through said discharge aperture when said portion of said rich air-fuel mixture is introduced into said trap chamber, the portion of said rich air-fuel mixture in said trap chamber being ignited by said spark plug on a combustion stroke of said engine, to thereby produce a torch jet which spurts into said main combustion chamber through both of said suction and discharge apertures to burn the compressed air-fuel mixture in said main combustion chamber.

9. An internal combustion engine according to claim 8, further comprising:

a separating wall disposed in said trap chamber for guiding the portion of said rich air-fuel mixture introduced into said trap chamber through said suction aperture towards said set of electrodes and for facilitating scavenging of said trap chamber.

* * * * *

UNITED STATES PATENT AND TRADEMARK OFFICE
CERTIFICATE OF CORRECTION

PATENT NO. : 4,077,363

DATED : March 7, 1978

INVENTOR(S) : Masaaki NOGUCHI, Masaharu SUMIYOSHI, Yukiyasu TANAKA and Taro TANAKA It is certified that error appears in the above-identified patent and that said Letters Patent are hereby corrected as shown below:

In the heading

Please add to Item [30] the following omitted Foreign Application Priority data:

November 23, 1973    Japan...... 48-131836

Signed and Sealed this

Seventeenth Day of October 1978

[SEAL]

Attest:

RUTH C. MASON
Attesting Officer

DONALD W. BANNER
Commissioner of Patents and Trademarks